United States Patent [19]
Barnett et al.

[11] Patent Number: 5,483,669
[45] Date of Patent: Jan. 9, 1996

[54] DYNAMIC THRESHOLDING FOR MOBILE ASSISTED HANDOFF IN A DIGITAL CELLULAR COMMUNICATION SYSTEM

[75] Inventors: Charles A. Barnett, Sterling, Va.; Stanley E. Kay, Rockville, Md.; Lou King, Mt. Airy, Md.; Ashok D. Mehta, North Potomac, Md.

[73] Assignee: Hughes Aircraft Company, Los Angeles, Calif.

[21] Appl. No.: 118,554

[22] Filed: Sep. 9, 1993

[51] Int. Cl.⁶ .............................. H04B 7/26; H04Q 7/22
[52] U.S. Cl. .......................... 455/33.2; 455/56.1; 455/62; 455/67.1; 379/60
[58] Field of Search .................... 455/33.1, 33.2, 455/54.1, 56.1, 34.1, 62, 67.1, 34.2, 54.2, 53.1; 379/59, 60

[56] References Cited

U.S. PATENT DOCUMENTS

| | | | |
|---|---|---|---|
| 5,050,234 | 9/1991 | Ohteru | 455/34.1 |
| 5,241,685 | 8/1993 | Bodin et al. | 455/33.2 |
| 5,267,261 | 11/1993 | Blakeney, II et al. | 455/33.1 X |
| 5,276,906 | 1/1994 | Felix | 455/33.2 |

*Primary Examiner*—Chi H. Pham
*Attorney, Agent, or Firm*—Gordon R. Lindeen, III; Wanda K. Denson-Low

[57] ABSTRACT

A method and system for handing off an on-going communication from a serving cell to a neighboring cell of a cellular communication system having mobile units with a scanning capability. A dynamic threshold is calculated for effecting the handoff under certain operating criteria. The minimum attenuation level of the mobile unit and the minimum level permitted by a neighboring cell is used in selecting the dynamic threshold.

12 Claims, 9 Drawing Sheets

DYNAMIC THRESHOLDING FOR MOBILE ASSISTED HANDOFF IN A DIGITAL CELLULAR COMMUNICATION SYSTEM

BACKGROUND OF THE INVENTION

1. Field of Invention

The present invention relates to cellular communication systems; and more particularly, to a method and system for effecting a handoff of an on-going cellular communication from a serving cell to a neighboring cell of a cellular communication system using signal strength measurements from mobile units having scanning capability.

2. Description of Related Art

A digital cellular communication system includes several base transceiver stations, each of which transmits and receives channels of RF information throughout a predetermined coverage area referred to as a cell. The outer boundary of a cell is determined not only by the effective radiated power of the base transceiver, which determines the maximum range at which a mobile unit is able to receive; but also, by the effective radiated power of the mobile telephones, which determines the maximum range at which the base station is able to receive.

In current cellular communication systems of the digital type, each mobile unit has scanning capability for control and/or scanning traffic channels in neighboring cells that may or may not overlap the cell in which the mobile unit is controlled, herein referred to as a serving cell. The scanning capability of the mobile units may be either controlled by commands from base station controller (BSC) and/or commence scanning upon detecting a received signal strength below a particular value.

Typically, a mobile unit would scan pre-selected control and/or traffic channels of the neighboring cells and report signal strength to corresponding base station controllers. When the signal strength equalled or exceeded predefined threshold values configured in the base station, the system would switch an on-going communication to the appropriate traffic channel of the neighboring cell, thus, effecting a handoff. This method requires that the digital mobile unit is able to receive the neighboring cells transmission, but does not require that the base transceiver station is able to receive the mobile units transmission.

This method for effecting handoff is quite satisfactory for high power mobiles. However, in the case of low power mobiles in large cells, handoff based solely on the raw mobile measurements results in dropped calls, because the mobile, although receiving a strong signal from the base station, is too far away for adequate reception at the base station. One prior art arrangement for overcoming this problem involves using the neighboring base station scanning receiver measurement to confirm the mobile measurements.

In view of the increasing use of low power digital units for cellular communication, and in light of the foregoing, there is a need for a system and method for effecting handoffs for digital mobile units that overcome the disadvantages of prior arrangements without the use of costly base station scanning receivers.

SUMMARY OF THE INVENTION

Accordingly, the present invention is directed to a method and system of handoff that substantially obviates one or more of the problems of the related art.

Additional features and advantages of the invention will be set forth in the description which follows, and in part will be apparent from the description, or may be learned by practice of the invention. The objectives and other advantages of the invention will be realized and attained by the method and system, particularly pointed out in the written description and claims hereof, as well as the appended drawings.

It is to be understood that both the foregoing general description and the following detailed description are exemplary and explanatory and are intended to provide further explanation of the invention as claimed.

To achieve these and other advantages and in accordance with the purpose of the invention, as embodied and broadly described, the invention is a method of mobile assisted handoff of a mobile telephone unit having scanning capability, from a serving cell to a neighboring cell of a cellular communication system that includes selecting a neighboring cell at times when the RF signal strength of the neighboring cell measured at the mobile unit exceeds a selected threshold value; and selecting the threshold value in accordance with a value corresponding to a minimum attenuation level permitted by the neighboring cell and the minimum attenuation level of the mobile unit.

In another aspect, the invention is a system for selecting a neighboring cell for handoff of a communication with a mobile unit having a scanning capability, comprising means for selecting a plurality of neighboring cells for measurement by the mobile unit; means for transmitting to the base station the measurement of channel quality of the neighboring cells at the mobile unit; means for effecting handoff to a neighboring cell at times when the RF signal strength of a neighboring cell measured at the mobile unit exceeds a selected threshold value; and means for selecting the threshold value in accordance with a value corresponding to a minimum attenuation level of the mobile unit permitted by the neighboring cell and a value corresponding to the minimum attenuation level of the mobile unit.

The accompanying drawings, which are incorporated in and constitute a part of this specification, illustrate an embodiment of the invention, and together with the description, serve to explain the objects, advantages, and principles of the invention.

DESCRIPTION OF PREFERRED EMBODIMENT

Reference will now be made in detail to the present preferred embodiment of the invention, an example of which is illustrated in the accompanying drawings.

Figure 1:
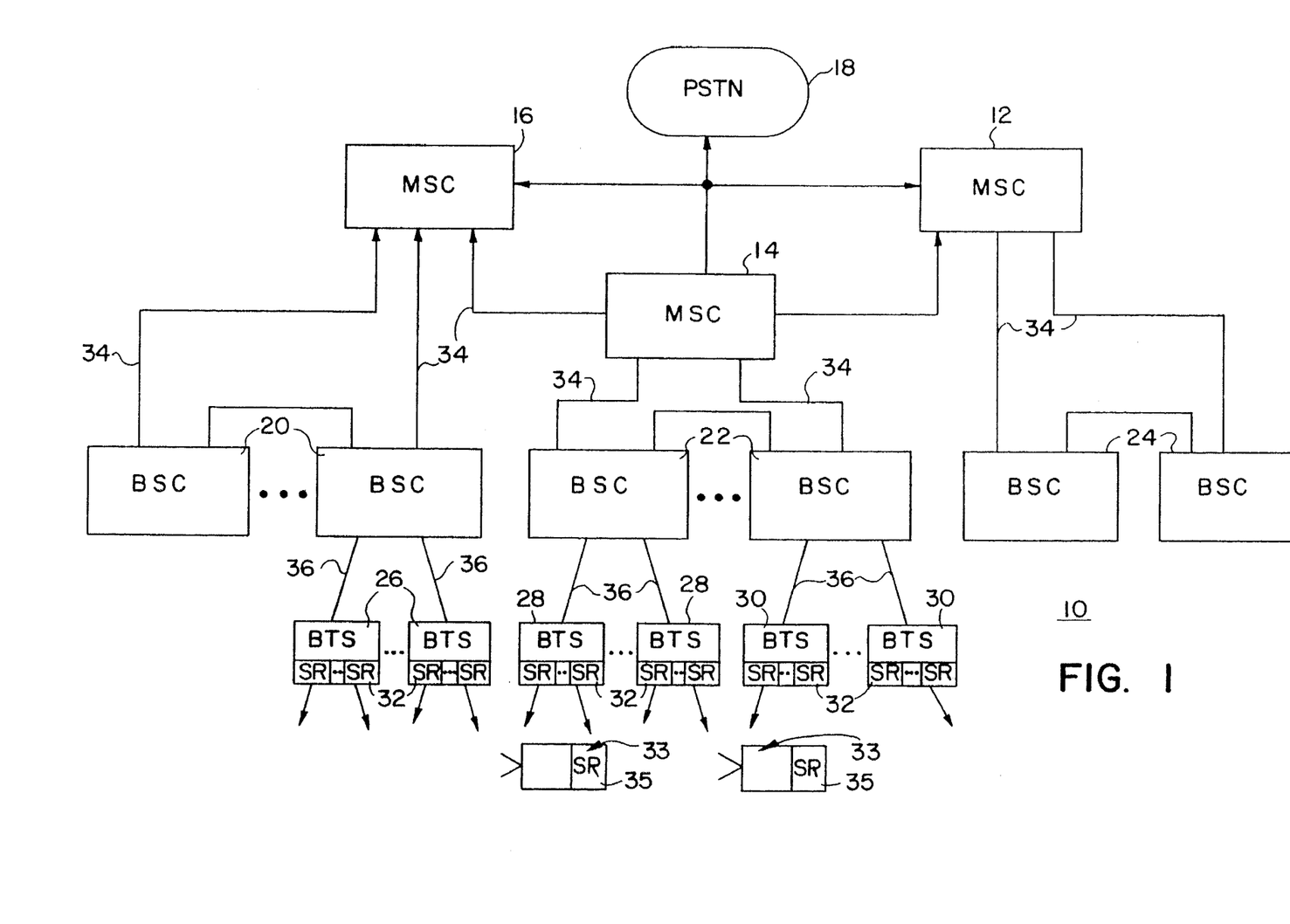
FIG. 1 is a block diagram of a cellular communication system incorporating the principles of the present invention.

A system for effecting handoff of an on-going mobile telephone communication from a serving cell to a neighboring cell is included in and is part of a cellular communication system as exemplified in FIG. 1, which system is generally referred to as 10.

Cellular system 10 has a plurality of mobile switching centers (MSC) 12, 14 and 16 which are connected to each other and to a public switched telephone network (PSTN) 18. Each of the MSC's is connected to a respective group of base station controllers (BSC), each group being referred to as 20, 22 and 24. Each BSC is connected to a group of individual base transceiver stations (BTS) referred to as 26, 28, and 30 respectively. Each BTS defines an individual cell of the communication system.

Each BTS of the groups 26, 28, and 30 includes hardware and software functions required to communicate over the radio channels of the system; and includes transmitters and receivers for communication with the mobile telephone units. Each BTS also includes digital multiplex equipment for transmission of audio traffic to its associated BSC.

A plurality of digital mobile units 32 are used with a system for communication over RF traffic channels with the BTS of a particular cell in which it is located. Associated with each digital mobile unit 32 is a scanning receiver 33 for scanning selected channels of the serving and neighboring cells.

Each BSC of group 20, 22, and 24 implements audio compression/decompression and handles call establishment, disconnect, and handoff procedures, and allocates system resources between the individual BTS's associated with a particular BSC. More specifically, each BSC performs handoff execution for transferring on-going communications from one cell to another within the group of BTS's connected to the particular BSC. Each BSC communicates with its associated MSC for effecting a handoff involving a cell or BTS associated with a different BSC.

Each MSC 12, 14, and 16 processes all requests for calls, switching functions, as well as the mobility functions of registration, call validation and handoff. Each MSC includes a home location register (HLR), which is a permanent data base of all subscribers and a visitor location register (VLR), which is a semi-permanent data base for users who are recently active in the area served by the MSC.

Figure 2:
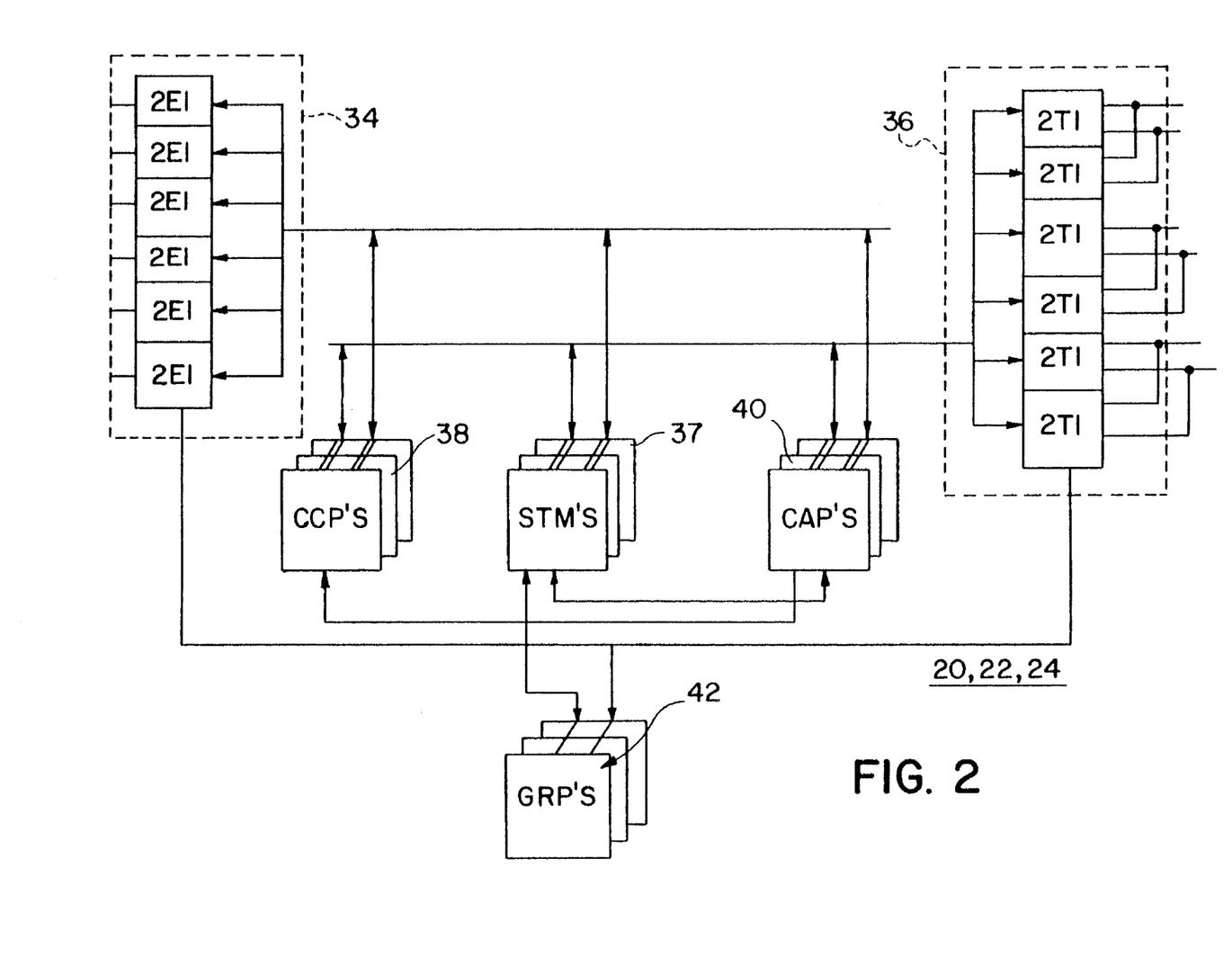
FIG. 2 iS a diagram of a base station controller utilized in carrying out the present invention.

Referring to FIG. 2, each BSC 20, 22 and 24 includes trunk interfaces 34 to its associated MSC and trunk interfaces 36 to its associated BTS. Also, each BSC includes a switching and transcoding module (STM) 37. Additionally, each BSC is made up of three types of control processors, which are implemented in identical hardware modules 38, 40, and 42.

Module 38 is a call control processor (CCP). In addition to switching of pulse code modulation (PCM) traffic between trunks 34 and 36 for analog traffic, it terminates call protocol for mobile switching, such as fast analog control channel (FACCH)/slow analog control channel (SACCH) processing and handoff execution. CCP also communicates with MSC for handoff execution. It also performs connection control and mobility management for handoff execution as hereinafter described in detail. For digital configurations there can be more than one CCP for each BSC. When there is more than one CCP per BSC, calls are distributed among CCP's based upon load. The number of CCP's depend upon load and redundancy requirements.

Hardware module 40, which is a channel access processor (CAP), is required for digital configurations as described herein and performs voice channel allocations and deallocations and forwards power error rate, and timing measurements to the CCP's. Handoff measurement involving mobile assisted handoff of the present invention is initiated at the CCP module 38 by sending a mobile measurement request message to the channel access processor CAP module 40. The CAP generates the measurement list and sends to the mobile unit a measurement order containing the control or traffic channels of the neighboring cells. The mobile unit then measures the RF signal strength at its scanning receiver and periodically sends a channel quality measurement message to the base station controller.

Hardware module 42 is a global resource processor (GRP) that distributes calls among the CCP's based on load; and communicates with other BSC's for scanning measurements; that is, a GRP communicates with another BSC to exchange messages relating to scanning (SR) measurements.

Figure 3:
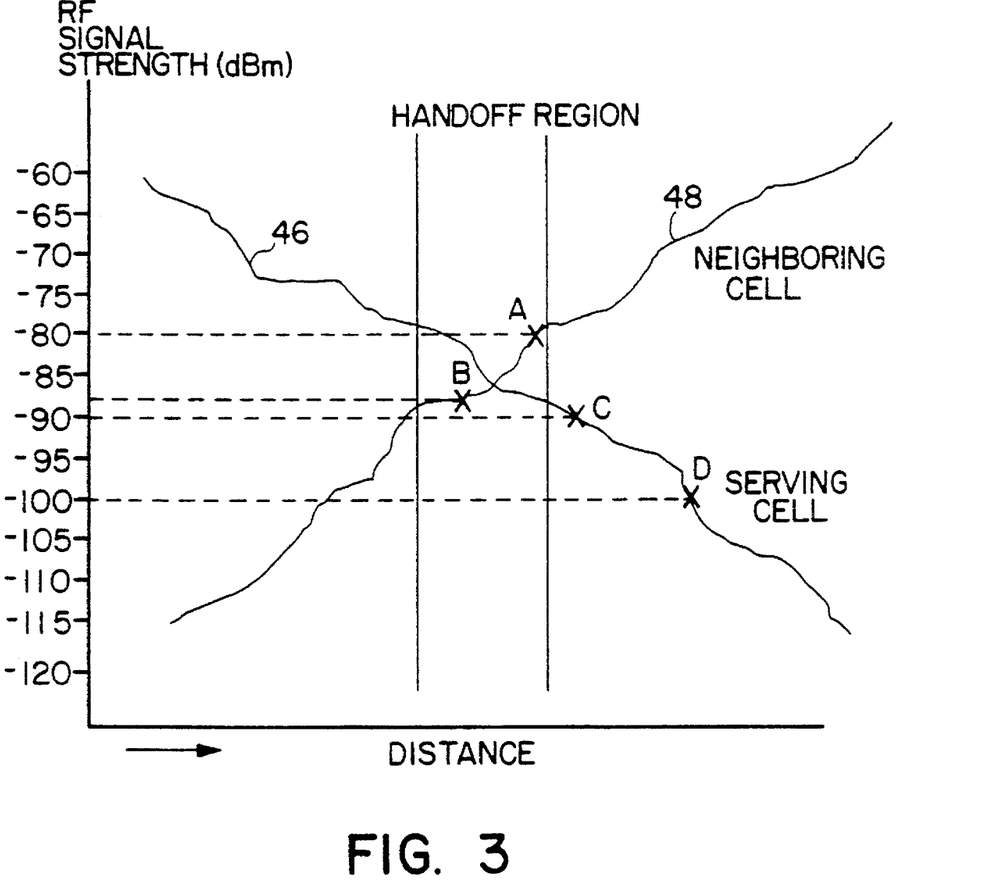
FIG. 3 is a diagram illustrating the relative RF signal strengths of a handoff region.

Referring to FIG. 3, typically the signal strength of a particular cell may range from minus forty dBM at the center of a cell to minus one hundred twenty dBM beyond the boundary of the cell. Assuming that a mobile unit is traveling outwardly from a serving cell in the direction of the arrow, the signal strength of the traffic channel decreases as indicated by line 46. The signal strength of the traffic channel of the neighboring cell reported by the scanning receiver of the mobile, of course, increases at the mobile unit as it travels out of the serving cell as indicated by line 48. In initially determining the RF signal strength for a nominal threshold, the RF signal strength measurement is calibrated at both the neighboring cell and the serving cell as the mobile travels in the direction of the arrow. While these measurements are being calibrated, the mobile transmit attenuation level is set by a command from the BSC to the minimum level allowed by the serving cell. After completion of the measurements, a diagram similar to FIG. 3 may be plotted; and a point can be selected at a level where adequate signal quality can be maintained while at the same time minimizing RF interference in the cellular network.

There are two fixed thresholds to be considered when calibrating the system initially. The first is a measurement threshold where handoff measurement is requested. The second is the fixed nominal cell selection threshold at which the mobile unit is transferred from the serving cell to the neighboring cell. The measurement threshold is chosen so that a call does not keep handing off back and forth between cells.

Referring to FIG. 3 assume that the handoff cell selection threshold signal strength is point A of FIG. 3, which is approximately minus eighty dBm, then the RF signal strength of the measurement threshold may be at point B between minus eighty-five and ninety dBm. A critical handoff-threshold may be chosen at point D, for example, and the handoff measurement threshold of the neighboring cell might be chosen to be point C, for example. In the system and method of the present invention, it is the cell selection threshold which is dynamically adjusted as hereinafter described. Each cell has a permanent cell measurement class. Thus, neighboring cells are separated into their individual measurement classes, which determines when a neighboring cell should be included in a particular measurement list.

The handoff measurement may be based upon a base station scanning receiver assisted handoff, the details of which are not part of this application, a mobile assisted handoff as described herein, or a mobile assisted handoff with scanning receiver confirmation. At times, a preferred handoff measurement mechanism is not compatible with the assigned call mode; and therefore, the preferred mechanism is overridden. For example, a base station scanning receiver assisted handoff is used for an analog communication. Mobile assisted handoff herein is used for digital, and whenever a particular class of cells is present in a neighboring measurement list, and a base station scanning receiver is the preferred handoff measurement mechanism, a mobile assisted handoff with base station scanning receiver confirmation is used. Whenever cells referred to as Class I cells are present in the neighboring cell list, they are included in the measurement list as soon as the call is established and handoff measurement initiated, other classes of cells are included in the handoff measurement when their particular measurement criteria are met.

There are several different classes of mobile telephones, which are classified in accordance with several parameters, including power output. When a mobile unit establishes a call, its class is recognized, and the BSC is commanded to control the unit at a particular mobile attenuation level, which may or may not be greater than its minimum attenuation level depending on its distance from the BTS and the power output of the mobile unit. In one preferred embodiment, a mobile unit may be commanded by a BSC to operate on any one of eight attenuation levels with each increment corresponding to 4 dB, for example. Thus, when a low, lowest, or minimum attenuation level is referred to herein, a high or highest power output of the mobile unit is presumed; and when a high, highest, or greatest attenuation level is referred to herein, the low or lowest power output of the mobile unit is presumed.

Prior to describing in detail the exemplary embodiment of that portion of the system and method for effecting the handoff from a serving cell to a neighboring cell, an explanation and detailed description of the meaning of the letter designations is set forth.

The designation RSSI-SRV refers to the RF signal strength of a mobile unit operating in a serving cell and measured by the serving cell. This signal also may be the traffic channel RF signal strength of the mobile unit in the serving cell. The designation RSSI-NBR refers to the RF signal strength of a neighboring cell measured at the mobile unit.

The designation RSSI-TH refers to a nominal cell selection threshold for an individual cell. This nominal threshold is permanently configured into the system and may be determined as hereinafter described. RSSI-THP refers to a dynamic cell selection threshold level having a value that is determined in accordance with the present invention. The value of the dynamic threshold RSSI-THP is predicated on several different parameters based on different operating conditions.

The designation MN refers to the minimum attenuation level of a mobile unit permitted by a neighboring cell. The designation MM refers to the minimum attenuation level of the mobile unit.

The designation RSSI-MSR-S refers to the RF signal strength handoff measurement threshold of a neighboring cell (i.e. neighbor of serving) as distinguished from the neighboring cell selection threshold RSSI-TH or RSSI-THP. The designation RSSI-MSR-T refers to the RF signal strength measurement threshold of a target cell as a neighbor of the neighboring cell.

The designation RSSI-H is a hysteresis value that is added to the RF signal strength of the serving cell when being compared with either RSSI-TH or RSSI-THP to prevent a ping pong effect. A default value of 3 dB is provided for RSSI-H.

The parameters used in handing off the on-going mobile communications in accordance with the present invention are either listed in the BSC where they relate to a status or a design of the system, or calculated in the BSC based on measurements taken at the mobile unit. The transmitter attenuation level of a mobile unit for a particular channel, which is an attenuation level that has been commanded by the BSC as determined by the forward or reverse traffic channel of the serving cell, is also listed in the associated BSC. The mobile units minimum attenuation level relates to the design of the mobile telephone, and is entered in the BSC when a particular unit either initiates or responds to a call. The minimum mobile transmit attenuation level allowed by a cell is also listed in the associated BSC. A mobile unit shall not transmit at a power level higher than permitted by the minimum permissible attenuation level as determined by the cellular boundaries.

Each BSC of a digital system maintains a list for its appropriate associated BTS's that includes the received signal strength of a traffic channel for a mobile unit in the serving cell and appropriate neighboring cells.

A more detailed description of the method and system of invention is provided herein in connection with a description of operation.

Figure 4:
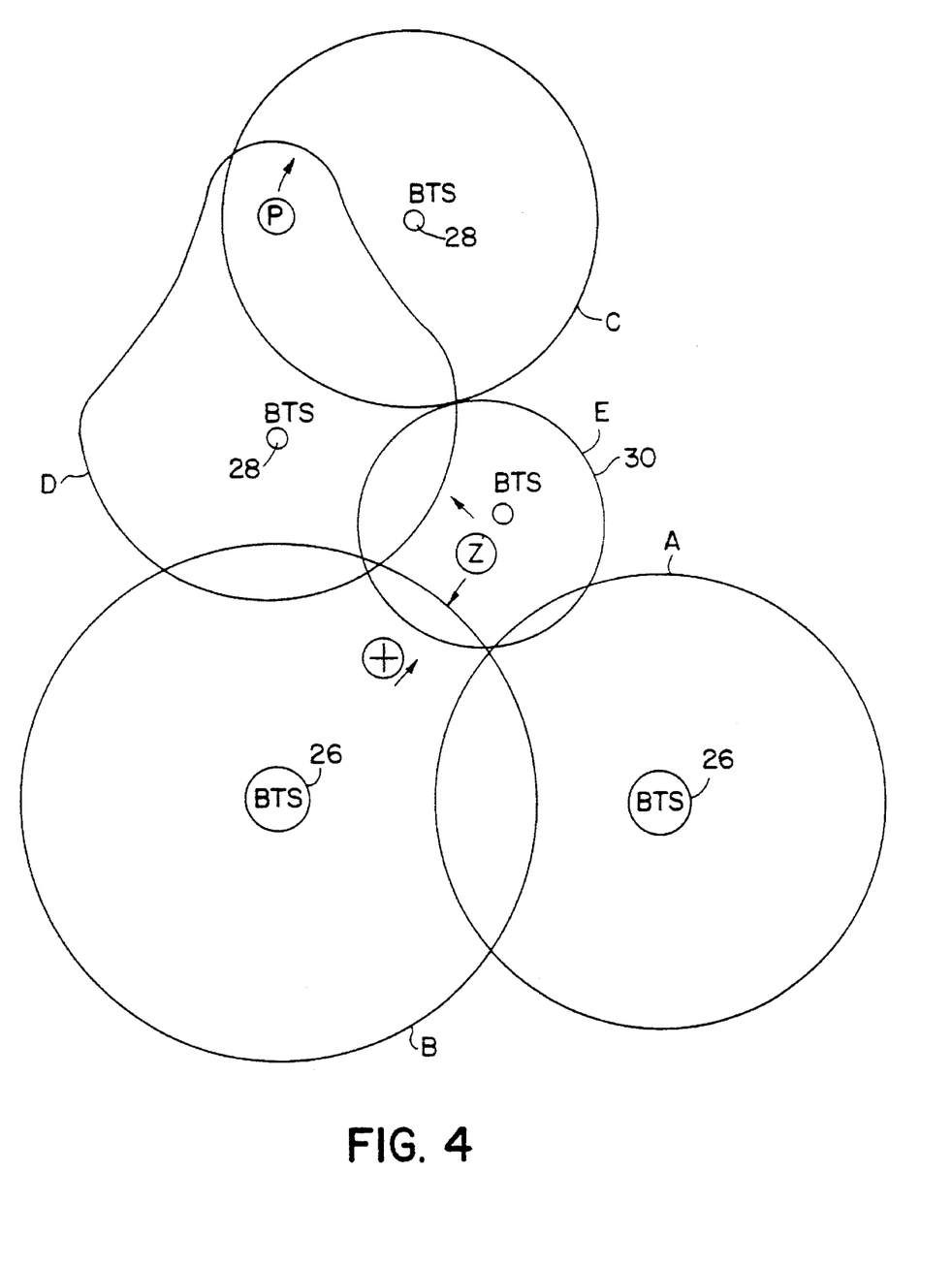
FIG. 4 is a diagram of a typical arrangement of overlapping cells of varying sizes.

Referring to FIG. 4, each of the circles represents a geographic boundary of an individual cell. For example, circle A and B may represent the boundary of a geographical area for respective one of the BTS 26, for example (FIG. 1). Cells A and B are similar in area. Since cells A and B are relatively large, a low mobile attenuation level is permitted. Similarly, circle C and D may represent the boundaries of geographical areas covered by respective ones of BTS 28, for example. Cells C and D though similar in size, cell D is assumed to be irregular because of terrain. Since cells C and D are slightly smaller than A and B, the cell may be limited to a higher minimum permissible attenuation level. Cell E is substantially smaller than the other cells; and thus is limited to a higher permissible attenuation level than cells C and D. Each of the neighboring cells (A–E) overlap. Thus, each of the mobile units will at times occupy two adjacent cells when in the handoff region, as shown in FIG. 3.

In mobile assisted handoff (MAHO), a handoff measurement list is created as described in connection with FIGS. 5 and 6 while the mobile travels away from the serving cell, and is transmitted to the mobile unit. The mobile unit measures the RF signal strength of the specific control or traffic channels and sends a corresponding message referred to as a channel quality measurement message to the base station controller of the serving cell. This message is received at the switching transcoder module (STM) and cell preselection takes place as hereinafter described in connection with FIG. 7. During preselection, a cell selection threshold is computed as hereinafter described in connection with FIG. 8. If the measurement list contains candidate cells that are equal to or less than twelve in number, the cell preselection takes place at the STM, otherwise the channel quality measurement message from the mobile unit is sent to the channel access processor (CAP) where cell preselection takes place. During cell preselection as described in connection with FIG. 5, a MAHO handoff request message containing the preselected cells, neighboring cell RF signal strength, and handoff parameters is sent to the channel control processor CCP where it is processed as described in connection with FIG. 9.

Figure 5:
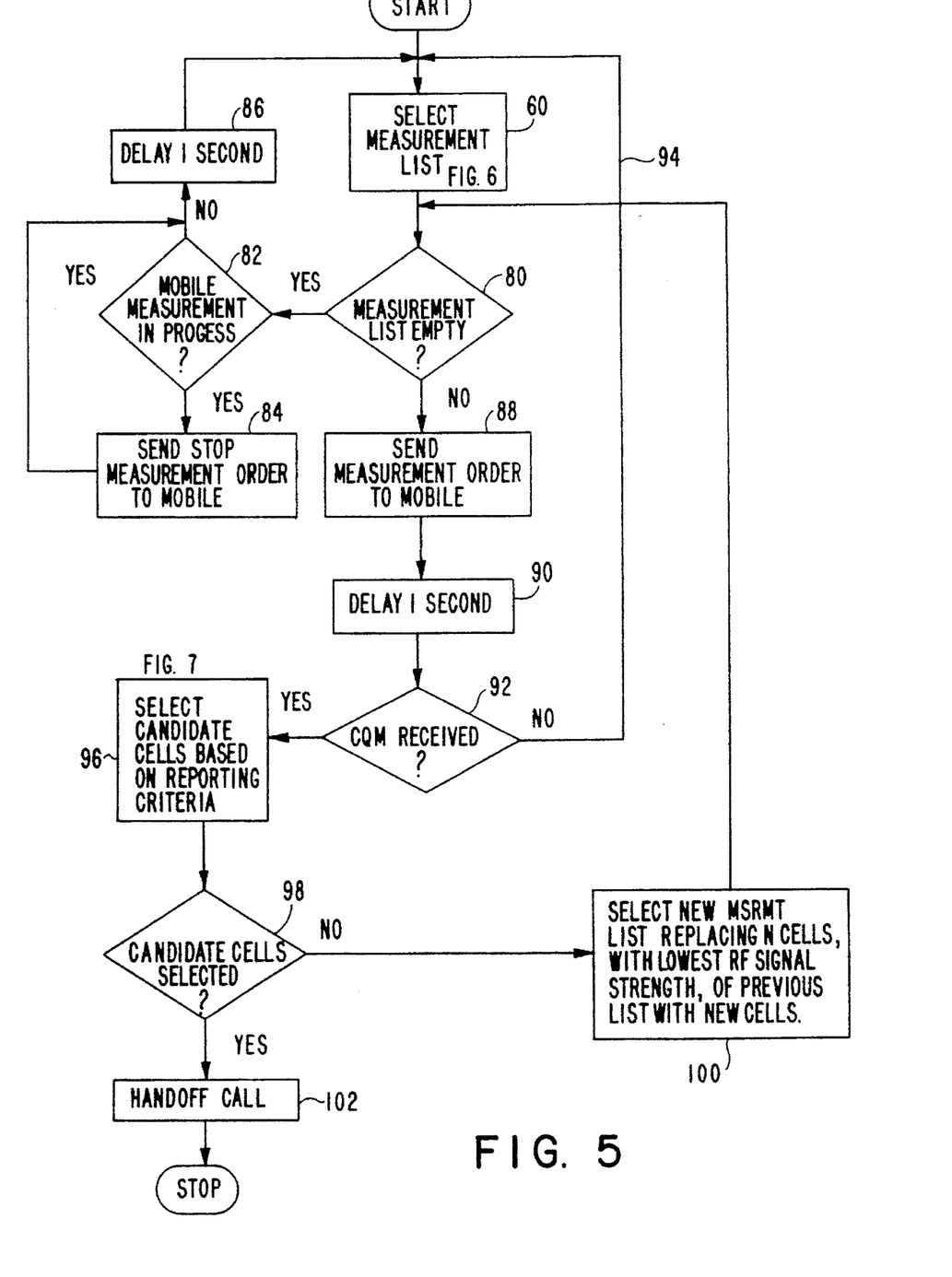
FIG. 5 is a flow chart illustrating generation of measurement processing at a base station controller for a mobile assisted handoff according to one embodiment of the present invention.
Figure 6:
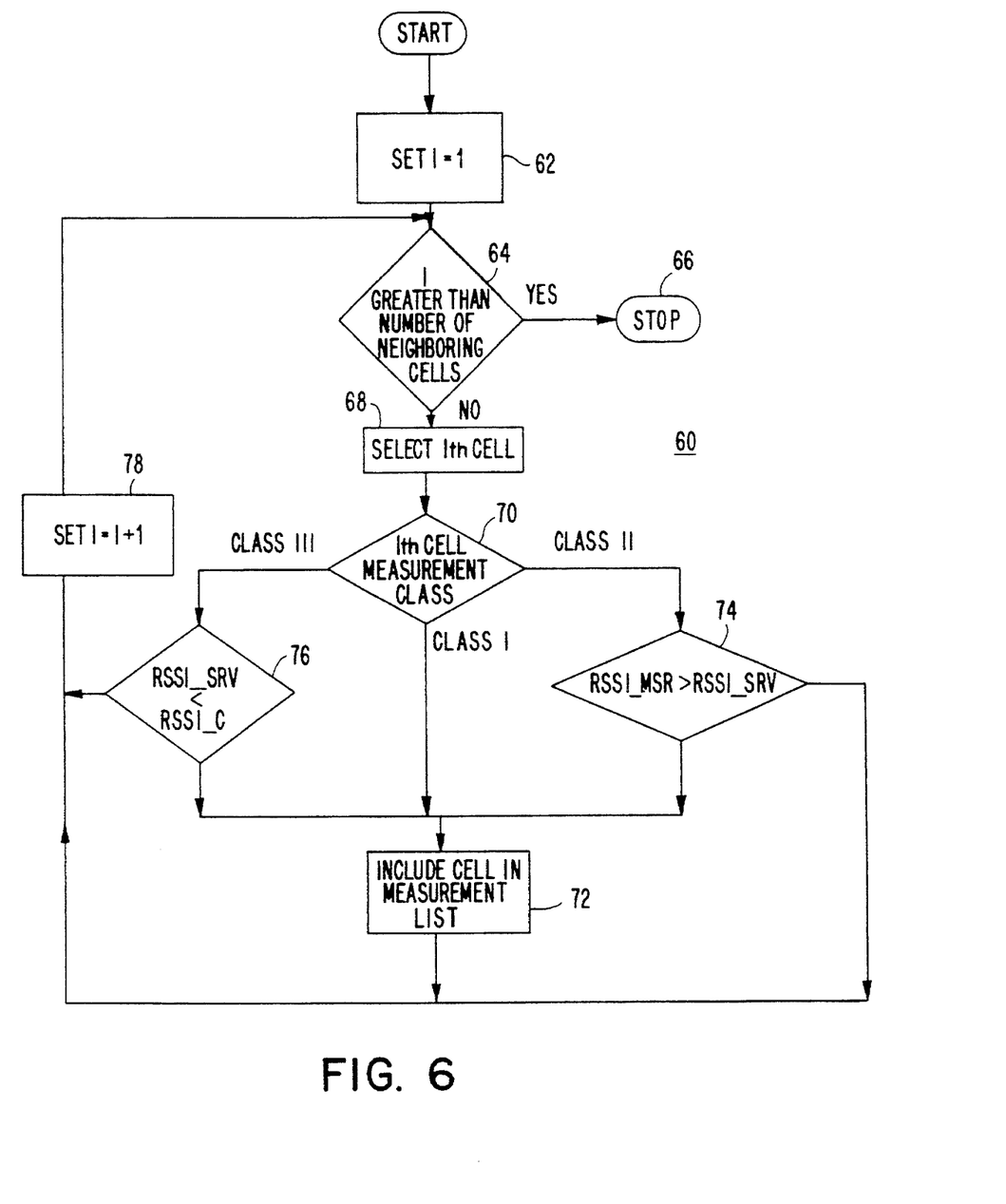
FIG. 6 is a flowchart illustrating generation of a measurement list for a mobile assisted handoff according to one embodiment of the present invention.

Referring to FIG. 5, the mobile assisted handoff measurement processing at the base station controller is activated as the mobile unit is departing from the serving cell. The system first selects the measurement list as indicated at step 60. The steps in selecting the measurement list at step 60 are illustrated in FIG. 6. Referring to FIG. 6, a counter is set at step 62. In the event there are no neighboring cells, as indicated at step 64, the routine is stopped at step 66. In the event that there are neighboring cells, a cell is chosen at step 68, and segregated into a measurement class at step 70. Class one cells are immediately included in the measurement list as indicated at step 72. Class two cells are included in the measurement list when their handoff measurement threshold RSSI-MSR is greater than the current traffic channel RF signal strength RSSI-SRV indicated at step 74. A selected cell is classified as a class three cell as indicated at step 76 in the event that the RF signal strength of the current serving cell RSSI-SRV is less than the critical threshold of the selected cell RSSI-C. After a cell has been included in the measurement list at 72, or is not included in the measurement list because of not meeting the criteria in block 74 and 76, the counter is incremented at step 78 and the routine is stopped at step 66 when the counter is at a number greater than the number of neighboring cells as indicated at step 64.

Returning to FIG. 5, a decision is made at step 80 as to whether or not the measurement list is empty, that is, whether or not it includes any neighboring cells that meet the previous criteria, or are classified as class one cells. In the event there are no neighboring cells in the measurement list, the system checks as to whether or not measurement at the mobile is in progress at step 82. In the event that it is in progress, a stop measurement order is sent to the mobile unit as indicated at step 84; and the routine is delayed one second as indicated at step 86 prior to commencing the selection of the measurement list at step 60. If the measurement list compiled according to FIG. 6 is not empty, then a measurement order is sent to the mobile unit at step 88. After a delay of one second as indicated at step 90, a decision is made at step 92 at to whether or not a channel quality measurement has been received from the mobile unit. If no channel quality measurement message has been received, the routine is recommenced as indicated by line 94. If the channel quality measurement has been received, then the system selects the candidate cells based upon certain reporting criteria as indicated at step 96. This selection is made in accordance with the routine shown in FIG. 7. If no candidate cells are selected as indicated by step 98, as a result of step 96, then a new measurement list is selected replacing the cells with lowest RF signal strength of a previous list with new cells as indicated at step 100 of FIG. 5. In the event that the candidate cells are selected at step 98, then a handoff call may be made at step 102 as described in more detail in connection with FIG. 9.

Figure 7:
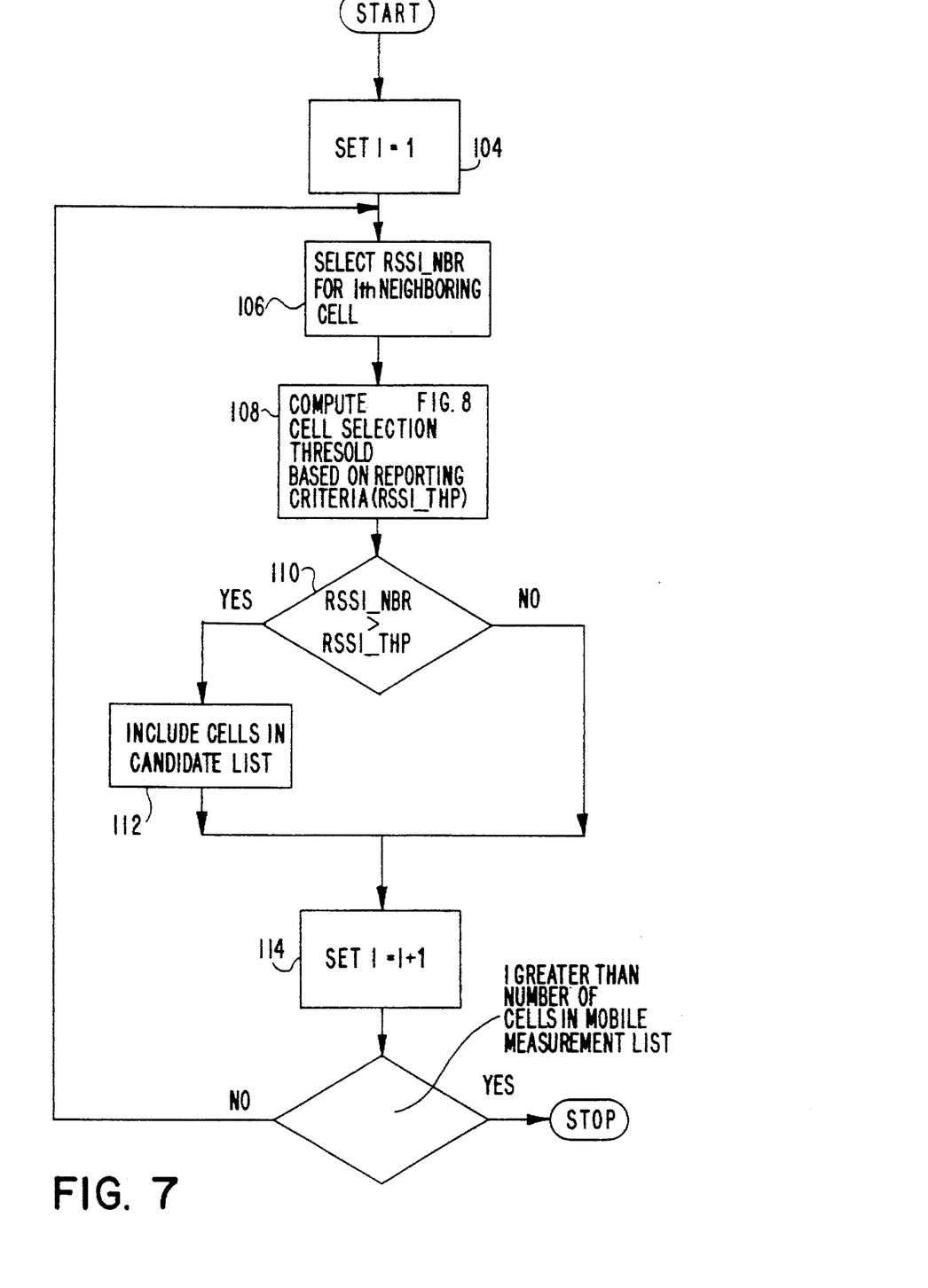
FIG. 7 is a flow chart illustrating initial cell selection based on mobile measurements received at a base station controller; according to one embodiment of the invention.

Referring to FIG. 7, the initial cell selection at step 96 of FIG. 5 is started by setting a counter at step 104 of FIG. 7. Then the RF signal strength of a neighboring cell measured by the scanner of the mobile unit is selected as indicated at step 106.

The present invention provides for computing selection threshold based on reporting criteria as indicated at step 108; and in accordance with the invention, cell selection threshold values RSSI-THP are selected in accordance with a value determined by a minimum attenuation level MM of the mobile unit and the minimum attenuation level MN permitted by the neighboring cell.

In accordance with the present invention if the RF signal strength of the neighboring cell measured at the mobile unit RSSI-NBR is greater than the selected threshold RSSI-THP, then the neighboring cell is included in the candidate cell list as indicated at step 112. If the criteria is not met at step 110, that is, if the computed threshold RSSI-THP is equal to or less than RSSI-NBR then the counter is incremented at step 114 and if there are still cells in the mobile measurement list, then another RF signal strength measured at the mobile unit for a neighboring cell RSSI-NBR is again selected at step 106.

Figure 8:
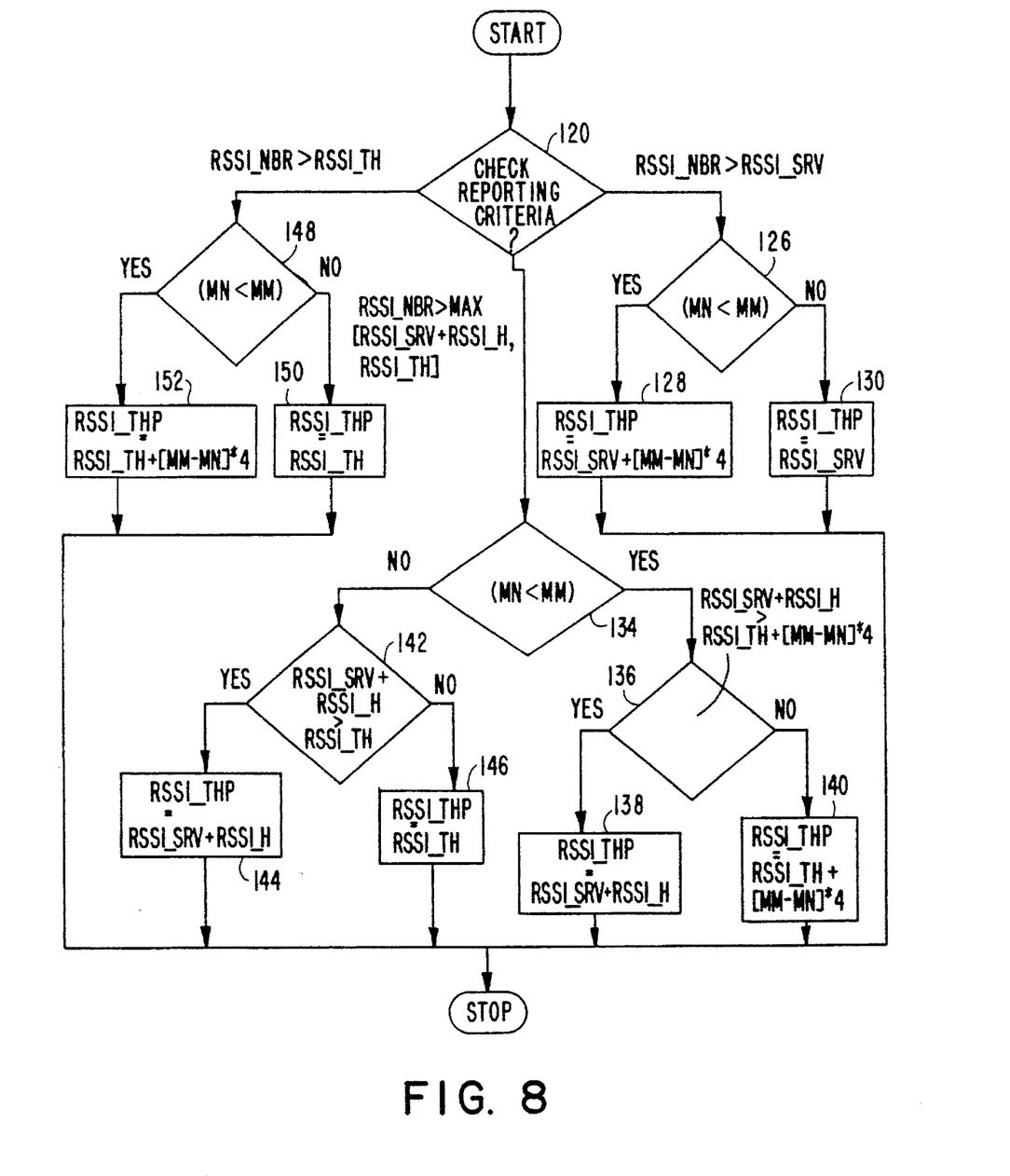
FIG. 8 is a flow chart illustrating the steps in the computation of dynamic threshold of a mobile assisted handoff in accordance with one embodiment of the invention.

As herein embodied, and referring to FIG. 8, the reporting criteria is checked at step 120. In the event that the RF signal strength of the neighboring cell measured at the mobile unit RSSI-NBR is greater than the nominal threshold value RSSI-TH of the neighboring cell, or the signal strength RSSI-NBR is greater than the RF signal strength of the serving cell RSSI-SRV, or the RSSI-NBR is greater than the maximum of the RSSI-SRV modified by a hysteresis value RSSI-H, and the nominal threshold RSSI-TH, then a threshold value RSSI-THP is selected.

In accordance with the invention the threshold RSSI-THP is selected in accordance with values corresponding to a minimum attenuation level permitted by the neighboring cell MN and the minimum attenuation level of the mobile unit MM.

As herein embodied, at times when the RF signal strength RSSI-NBR measured at the mobile unit exceeds at least one of the nominal threshold value RSSI-TH and the RF signal strength of the traffic channel of the serving cell RSSI-SRV the threshold value RSSI-THP is calculated to correspond to the sum of a nominal threshold value RSSI-TH and the minimum attenuation level permitted by the neighboring cell MN less the minimum attenuation level of the mobile unit MM. In the event that the minimum attenuation level permitted by the neighboring cell MN is less than the minimum attenuation level of the mobile unit MM as indicated at step 126, then the cell selection threshold RSSI-THP corresponds to the RF signal strength of the serving cell RSSI-SRV, plus a value corresponding to the difference between the minimum attenuation level of the mobile unit MM less the minimum attenuation level permitted by the neighboring cell MN multiplied by four, as shown at step 128. The factor four corresponds to the decibelsdBm of each attenuation level of the system. In the event that the minimum attenuation level MN at step 126 is equal to or greater than the minimum attenuation level MM, then the threshold value RSSI-THP is equal to the RF signal strength of the serving cell RSSI-SRV as indicated at step 130.

In the event that the reporting criteria is determined, such that the RF signal strength of the neighboring cell measured at the mobile unit is greater than the maximum of a value corresponding to the RF signal strength of the serving cell plus the hysteresis value and the nominal threshold involves, and the minimum attenuation level permitted by the neighboring cell MN, is less than the minimum attenuation level of the mobile unit MM as indicated at step 134 and the RF signal strength of the serving cell RSSI-SRV plus the hysteresis value RSSI-H is greater than the nominal threshold RSSI-TH plus a value corresponding to the difference between the minimum attenuation level of the mobile unit MM less the minimum attenuation level permitted by the neighboring cell MM multiplied by four as shown at step 136, then the threshold level RSSI-THP is equal to the RF signal strength level of the serving cell RSSI-SRV plus the hysteresis value RSSI-H as indicated at step 138.

However, if the value RSSI-SRV plus the hysteresis value RSSI-H of block 136 is equal to or less than the nominal threshold value RSSI-TH plus a value corresponding to the difference between the minimum attenuation level of the mobile unit MM less the minimum attenuation level permitted by the neighboring cell MN multiplied by four, then the threshold level RSSI-THP is equal to the sum of the nominal threshold RSSI-TH plus a value corresponding to the difference between the minimum attenuation level of the mobile unit MM less the minimum attenuation level permitted by the neighboring cell MN multiplied by four, as indicated at step 140.

In the event that the minimum attenuation level of the mobile unit MM is equal to or less than the minimum attenuation level permitted by the neighboring cell MM at step 134, and the RF signal strength of the serving cell RSSI-SRV plus the hysteresis value RSSI-H is greater than the nominal threshold RSSI-TH as indicated at step 142, then the threshold value RSSI-THP equals the RF signal strength of the serving cell RSSI-SRV plus the hysteresis value RSSI-H at step 144. If the value RSSI-SRV plus the hysteresis value RSSI-H is equal to or less than the nominal threshold value RSSI-TH at step 142, then the threshold value RSSI-THP is equal to the nominal threshold value RSSI-TH, as indicated at step 146.

At times when the reporting criteria indicates that the RF signal strength of the neighboring cell measured at the mobile unit RSSI-NBR is greater than the nominal threshold value of the neighboring cell RSSI-TH and the minimum attenuation level permitted by the neighboring cell MN is equal to or greater than minimum attenuation level of the mobile unit MM at blocks 148, then the computed threshold level RSSI-THP is equal to the nominal threshold level RSSI-TH as indicated at block 150. In the event that the minimum attenuation level permitted by the neighboring cell MN is less than the minimum attenuation level of the mobile unit MM as indicated at blocks 148, then the computed threshold level RSSI-THP of the present invention is equal to the nominal threshold value RSSI-TH plus a value corresponding to the minimum attenuation level of the mobile unit MM less the minimum attenuation level permitted by the neighboring cell MN multiplied by four, as shown at step 152.

Figure 9:
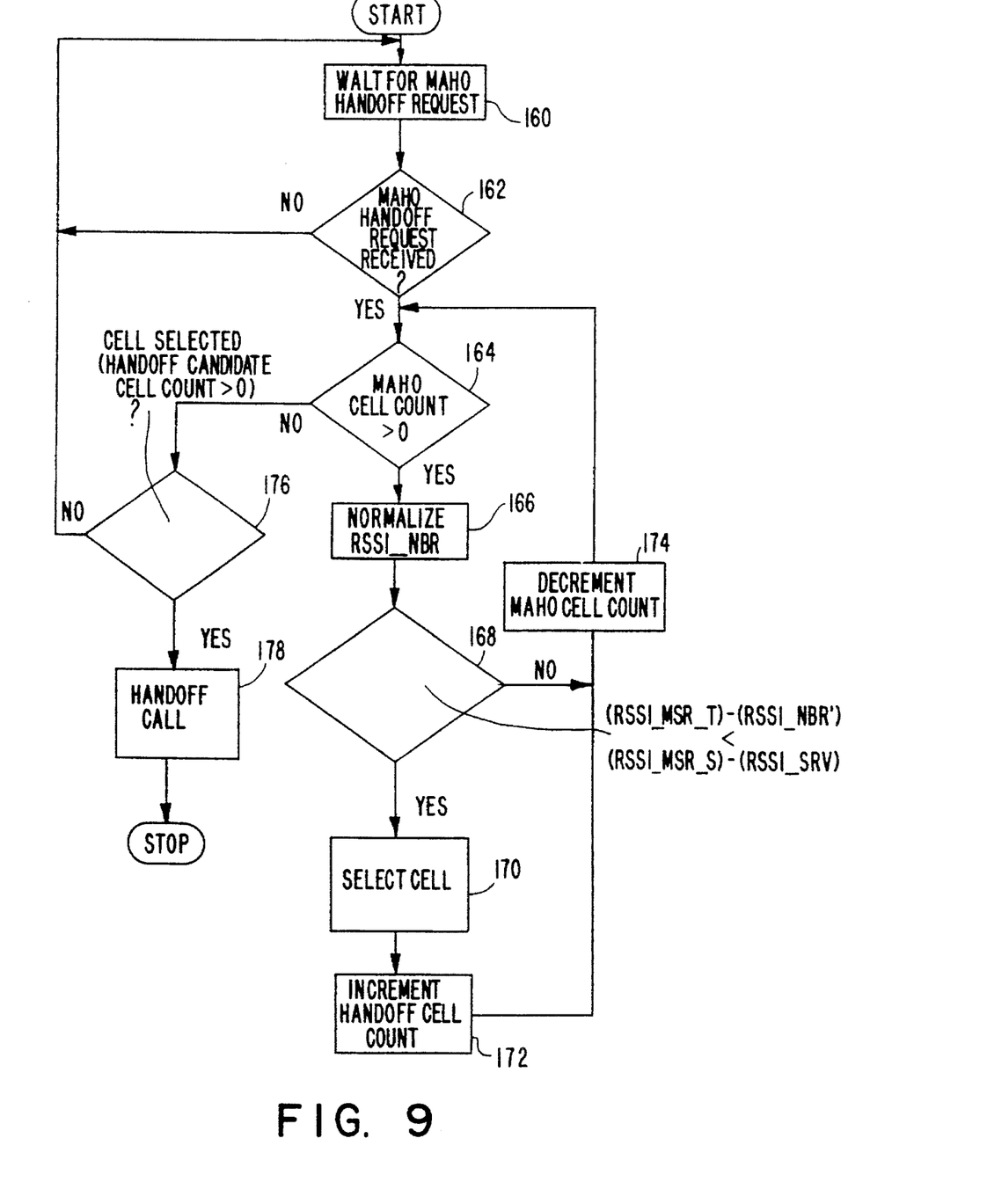
FIG. 9 is a flow chart illustrating the steps in final handoff cell selection based on mobile assisted handoff of the present invention.

Returning to FIG. 7, if the value RSSI-NBR is greater than the computed threshold RSSI-THP, then the cell is included in the candidate list at step 112 as previously described. Whenever cell preselection takes place, as indicated at step 98 of FIG. 5, a mobile assisted handoff request message containing the preselected cells, a signal strength RSSI-NBR of a neighboring cell, and handoff parameters, is sent to the channel control processor CCP where it is processed as shown in FIG. 9. Upon receiving the mobile assisted handoff cell selection message, the CCP performs final cell selection if scanning receiver confirmation is not required. Final cell selection is based solely on the mobile assisted handoff mechanism as described herein.

Referring to FIG. 9, the routine is dormant as indicated at step 160 until the handoff request is received at step 162. If the mobile assisted handoff mechanism cell count is greater than zero at step 164, the RF signal strength of the neighboring cell measured at the mobile unit RSSI-NBR is normalized at step 166. When normalizing RSSI-NBR, the value RSSI-NBR is added to (MM-MN) 4 when MN is equal to or less than MM or subtracted when MM is greater than MN. This increases or decreases the traffic channel signal strength of the neighboring cell to accommodate the minimum attenuation level of the mobile unit. The normalized value is then subtracted from the measurement threshold of the serving cell RSSI-MSR-T, and this difference value of the serving cell is compared to the difference value of the measurement threshold of the neighboring cell RSSI-MSR-S less the RF signal strength of the serving cell RSSI-SRV. If the difference value of the serving cell is less than the difference value of the neighboring cell, as indicated at step 168, then this particular cell is selected at step 170. The handoff cell count is then incremented at step 172 and decremented at step 174. Thus, if the cell is selected, the cell count is not reduced at step 164. If there are no cells to which hand off can be made when counted at step 164, and the handoff candidate cell count is greater than zero as determined at step 176, the consummation of the mobile unit handoff is carried out at step 178.

It will be apparent to those skilled in the art that various modification and variations can be made in the method and system of the present invention without departing from the spirit or scope of the invention. Thus, it is intended that the present invention cover modification and variations of this invention provided they come within the scope of the appended claims and their equivalents.

What is claimed is:

1. A method of selecting a neighboring cell for handoff of a communication with a mobile unit having a scanning capability, the method comprising:

selecting a dynamic threshold value in accordance with a value corresponding to a minimum attenuation level permitted by the neighboring cell and the minimum attenuation level of the mobile unit; and selecting the neighboring cell at times when an RF signal strength of the neighboring cell measured at the mobile unit exceeds the dynamic threshold value.

2. The method of claim 1 wherein the step of selecting the dynamic threshold value comprises the substeps of:

determining the dynamic threshold value to correspond to the sum of a nominal threshold value and the minimum attenuation level permitted by the neighboring cell subtracted from the minimum attenuation level of the mobile unit at times when the RF signal strength of the neighboring cell at the mobile unit exceeds at least one of the nominal threshold value and the RF signal strength of the traffic channel of the serving cell.

3. The method of claim 1 wherein the step of selecting the dynamic threshold value comprises the substeps of:

selecting a dynamic threshold having a value corresponding to the RF signal strength of the traffic channel of the serving cell at times when the minimum attenuation level permitted by the neighboring cell is not less than the minimum attenuation level of the mobile unit.

4. The method of claim 1 wherein the step of selecting the dynamic threshold value comprises selecting the dynamic threshold having a value corresponding to the traffic channel RF signal strength of the serving cell plus a hysteresis value at times when said dynamic threshold value is greater than a value corresponding to the sum of a nominal threshold value and a minimum attenuation level of the mobile unit less the minimum attenuation level permitted by the neighboring cell, while the minimum attenuation level permitted by the neighboring cell is less than the minimum attenuation level of the mobile unit.

5. The method of claim 1 wherein the step of selecting the dynamic threshold value comprises the substeps of:

selecting the dynamic threshold value corresponding to the RF signal strength of the traffic channel of the serving cell plus a hysteresis value at times when said dynamic threshold value is greater than a nominal threshold value, and the minimum attenuation level permitted by the neighboring cell is not less than the minimum attenuation level of the mobile unit.

6. The method of claim 1 wherein the step of selecting the dynamic threshold value comprises the substeps of:

selecting the dynamic threshold value corresponding to a nominal threshold value plus the minimum attenuation level of the mobile unit less the minimum attenuation level permitted by the neighboring cell at times when the RF signal strength of the serving cell plus a hysteresis value does not exceed said dynamic threshold value, and the minimum attenuation level permitted by the neighboring cell is less than the minimum attenuation level of the mobile unit.

7. A system for selecting a neighboring cell for handoff of a communication between a base station and a mobile unit having a scanning capability, said neighboring cell having an RF signal strength, said system comprising:

means for selecting a plurality of neighboring cells for measurement by the mobile unit;

means for transmitting to the base station the measurement of channel quality of the neighboring cells at the mobile unit;

means for effecting handoff to a neighboring cell at times when the RF signal strength of a neighboring cell measured at the mobile unit exceeds a dynamic threshold value; and means for selecting the dynamic threshold value in accordance with a value corresponding to a minimum attenuation level of the mobile unit permitted by the neighboring cell and a value corresponding to the minimum attenuation level of the mobile unit.

8. The system of claim 7 wherein the means for selecting the dynamic threshold value comprises means for causing the dynamic threshold value to correspond to the sum of a nominal threshold value and the minimum attenuation level permitted by the neighboring cell less the minimum attenuation level of the mobile unit at times when the RF signal strength of the neighboring cell measured at the mobile unit exceeds at least one of the nominal threshold value and the RF signal strength of the traffic channel of the serving cell.

9. The system of claim 7 wherein the means for selecting the dynamic threshold value comprises means for selecting the dynamic threshold having a value corresponding to the RF signal strength of the traffic channel of the mobile unit in the serving cell at times when the minimum attenuation level permitted by the neighboring cell is not less than the minimum attenuation level of the mobile unit.

10. The system of claim 7 wherein the means for selecting the dynamic threshold value comprises means for selecting the dynamic threshold having a value corresponding to the traffic channel RF signal strength of the serving cell plus a hysteresis value at times when said dynamic threshold value is greater than a value corresponding to the sum of a nominal threshold value and a minimum attenuation level of the mobile unit less the minimum attenuation level of the neighboring cell, and the minimum mobile attenuation level is equal to or greater than the minimum attenuation level permitted by the neighboring cell.

11. The system of claim 7 wherein the means for selecting the dynamic threshold value comprises means for selecting the dynamic threshold value corresponding to the RF signal strength of the traffic channel of the serving cell plus a hysteresis value at times when said dynamic threshold value is greater than a nominal threshold value, and the minimum attenuation level permitted by the neighboring cell is not less than the minimum attenuation level of the mobile unit.

12. The system of claim 7 wherein the means for selecting the dynamic threshold value comprises means for selecting the dynamic threshold value corresponding to a nominal threshold value plus the minimum attenuation level of the mobile unit less the minimum attenuation level permitted by the neighboring cell at times when the RF signal strength of the serving cell plus a hysteresis value does not exceed said dynamic threshold value, and the minimum attenuation level permitted by the neighboring cell is less than the minimum attenuation level of the mobile unit.

* * * * *